United States Patent
Hamagami et al.

(10) Patent No.: US 11,623,648 B2
(45) Date of Patent: Apr. 11, 2023

(54) INFORMATION PROCESSING SYSTEM, PROGRAM, AND CONTROL METHOD

(71) Applicant: TOYOTA JIDOSHA KABUSHIKI KAISHA, Toyota (JP)

(72) Inventors: Kana Hamagami, Nissin (JP); Takuya Maekawa, Nissin (JP); Yosuke Nakayama, Owariasahi (JP); Akitoshi Jikumaru, Nissin (JP); Tae Sugimura, Miyoshi (JP); Takao Hishikawa, Nagoya (JP); Shinichi Adachi, Takahama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/512,385

(22) Filed: Oct. 27, 2021

(65) Prior Publication Data

US 2022/0048522 A1 Feb. 17, 2022

Related U.S. Application Data

(63) Continuation of application No. 16/658,903, filed on Oct. 21, 2019, now Pat. No. 11,479,259.

(30) Foreign Application Priority Data

Dec. 3, 2018 (JP) .............................. JP2018-226449

(51) Int. Cl.
*B60W 40/09* (2012.01)
*G06Q 10/10* (2023.01)
(Continued)

(52) U.S. Cl.
CPC ............. *B60W 40/09* (2013.01); *G06Q 10/10* (2013.01); *G06Q 40/08* (2013.01); *G06V 20/56* (2022.01); *G06V 40/10* (2022.01)

(58) Field of Classification Search
CPC ....................................................... B60W 40/09
See application file for complete search history.

(56) References Cited

U.S. PATENT DOCUMENTS

| 10,323,954 B2 | 6/2019 | Wan et al. |
| 11,226,209 B2 | 1/2022 | Hamagami et al. |
| (Continued) | | |

FOREIGN PATENT DOCUMENTS

| JP | 2003-6439 A | 1/2003 |
| JP | 2003-14474 A | 1/2003 |
| (Continued) | | |

OTHER PUBLICATIONS

Office Action dated May 10, 2022, in co-pending U.S. Appl. No. 16/658,903, 16 pages.
(Continued)

*Primary Examiner* — Michael A Berns
(74) *Attorney, Agent, or Firm* — Oblon, McClelland, Maier & Neustadt, L.L.P.

(57) ABSTRACT

An information processing system includes a vehicle and a server that is communicatively connected to the vehicle. The vehicle is configured to acquire position information of the vehicle, to acquire driving information of a driver of the vehicle, and to detect occurrence of a traffic accident associated with the vehicle. When a notification of occurrence of a traffic accident is received from the vehicle, the server is configured to calculate a driving skill level of the driver based on the driving information, to store provision information in which the position information of a point at which the traffic accident has occurred is correlated with the driving skill level and the number of times of occurrence of a traffic accident at the point, and to provide the provision information to an insurance company.

6 Claims, 5 Drawing Sheets

(51) Int. Cl.
*G06Q 40/08* (2012.01)
*G06V 20/56* (2022.01)
*G06V 40/10* (2022.01)

(56) References Cited

U.S. PATENT DOCUMENTS

| | | | |
|---|---|---|---|
| 11,479,259 B2* | 10/2022 | Hamagami | ............ G06V 40/10 |
| 2020/0172114 A1 | 6/2020 | Hamagami et al. | |
| 2020/0173801 A1 | 6/2020 | Hamagami et al. | |
| 2020/0286183 A1 | 9/2020 | Furukawa | |
| 2021/0372804 A1 | 12/2021 | Nakanishi et al. | |
| 2022/0048522 A1 | 2/2022 | Hamagami et al. | |

FOREIGN PATENT DOCUMENTS

| | | |
|---|---|---|
| JP | 2005-25667 A | 1/2005 |
| JP | 2010-72845 A | 4/2010 |
| JP | 2016-81087 A | 5/2016 |
| JP | 2017-97477 A | 6/2017 |
| WO | WO 2008/038340 A1 | 4/2008 |

OTHER PUBLICATIONS

Notice of Allowance dated Aug. 31, 2022 in co-pending U.S. Appl. No. 16/658,903, 7 pages.
Office Action dated Feb. 18, 2022 in co-pending U.S. Appl. No. 16/658,903, 17 pages.

* cited by examiner

FIG. 4

| POINT P WHERE TRAFFIC ACCIDENT OCCURS | DRIVING SKILL LEVEL | NUMBER OF TIMES OF OCCURRENCE OF TRAFFIC ACCIDENT |
|---|---|---|
| P1 | LOW | 10 |
|  | MIDDLE | 5 |
|  | HIGH | 1 |
| P2 | LOW | 5 |
|  | MIDDLE | 5 |
|  | HIGH | 5 |
| ... | ... | ... |

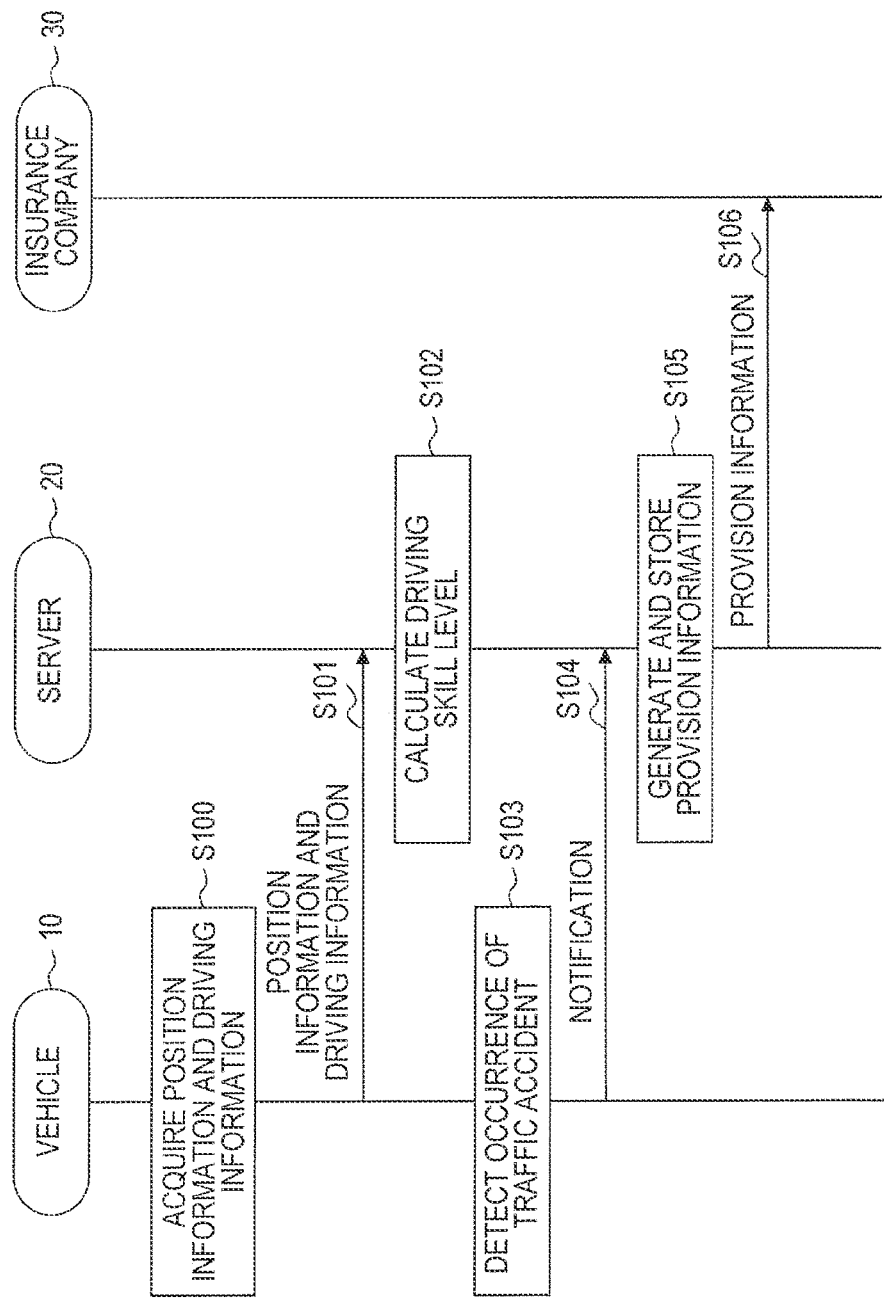

INFORMATION PROCESSING SYSTEM, PROGRAM, AND CONTROL METHOD

INCORPORATION BY REFERENCE

This application is a continuation application of U.S. application Ser. No. 16/658,903, filed Oct. 21, 2019, which claims priority to Japanese Patent Application No. 2018-226449 filed on Dec. 3, 2018. The entire contents of each are incorporated herein by reference in its entirety.

BACKGROUND

1. Technical Field

The disclosure relates to an information processing system, a program, and a control method.

2. Description of Related Art

In the related art, a technique of appropriately determining details of an insurance contract which is made by a driver of a vehicle based on a superiority level of the driver is known. For example, PCT International Publication No. 2008/038340 discloses an insurance information output method of detecting behavior of a moving object, acquiring danger information, and determining a superiority level of an insured person on use of the moving object based on the danger information.

SUMMARY

As in the related art, in addition to determination of a superiority level of a driver who is an insured person and appropriate determination of details of a contract such as an insurance premium, there is demand for appropriately determining details of compensation for the insured person when a traffic accident of a vehicle actually occurs.

The disclosure provides an information processing system, a program, and a control method that can contribute to appropriate determination of details of compensation which is supplied from an insurance company to an insured person when a traffic accident occurs.

According to an embodiment of the disclosure, there is provided an information processing system including a vehicle and a server that is communicatively connected to the vehicle. The vehicle is configured to acquire position information of the vehicle, to acquire driving information of a driver of the vehicle, and to detect occurrence of a traffic accident associated with the vehicle. The server is configured to calculate a driving skill level of the driver based on the driving information, to store provision information in which the position information of a point at which the traffic accident has occurred is correlated with the driving skill level and the number of times of occurrence of a traffic accident at the point, and to provide the provision information to an insurance company, when a notification of occurrence of a traffic accident is received from the vehicle.

According to an embodiment of the disclosure, there is provided a program which operates in an information processing system including a vehicle and a server that is communicatively connected to the vehicle. The program causes the vehicle to perform: acquiring position information of the vehicle; acquiring driving information of a driver of the vehicle; and detecting occurrence of a traffic accident associated with the vehicle. The program causes the server to perform: calculating a driving skill level of the driver based on the driving information; storing provision information in which the position information of a point at which the traffic accident has occurred is correlated with the driving skill level and the number of times of occurrence of a traffic accident at the point; and providing the provision information to an insurance company, when a notification of occurrence of a traffic accident is received from the vehicle.

According to an embodiment of the disclosure, there is provided a control method in an information processing system including a vehicle and a server that is communicatively connected to the vehicle. The control method includes: causing the vehicle to perform: acquiring position information of the vehicle; acquiring driving information of a driver of the vehicle; and detecting occurrence of a traffic accident associated with the vehicle; and causing the server to perform: calculating a driving skill level of the driver based on the driving information; storing provision information in which the position information of a point at which the traffic accident has occurred is correlated with the driving skill level and the number of times of occurrence of a traffic accident at the point; and providing the provision information to an insurance company, when a notification of occurrence of a traffic accident is received from the vehicle.

With the information processing system, the program, and the control method according to the embodiments of the disclosure, it is possible to contribute to appropriate determination of details of compensation which is supplied from an insurance company to an insured person when a traffic accident occurs.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram illustrating an example of provision information which is stored in a storage unit of the server; and FIG. 5 is a sequence diagram illustrating an example of a flow of operations in the information processing system.

DETAILED DESCRIPTION OF EMBODIMENTS

Hereinafter, an embodiment of the disclosure will be described with reference to the accompanying drawings.

Information Processing System

Figure 1:
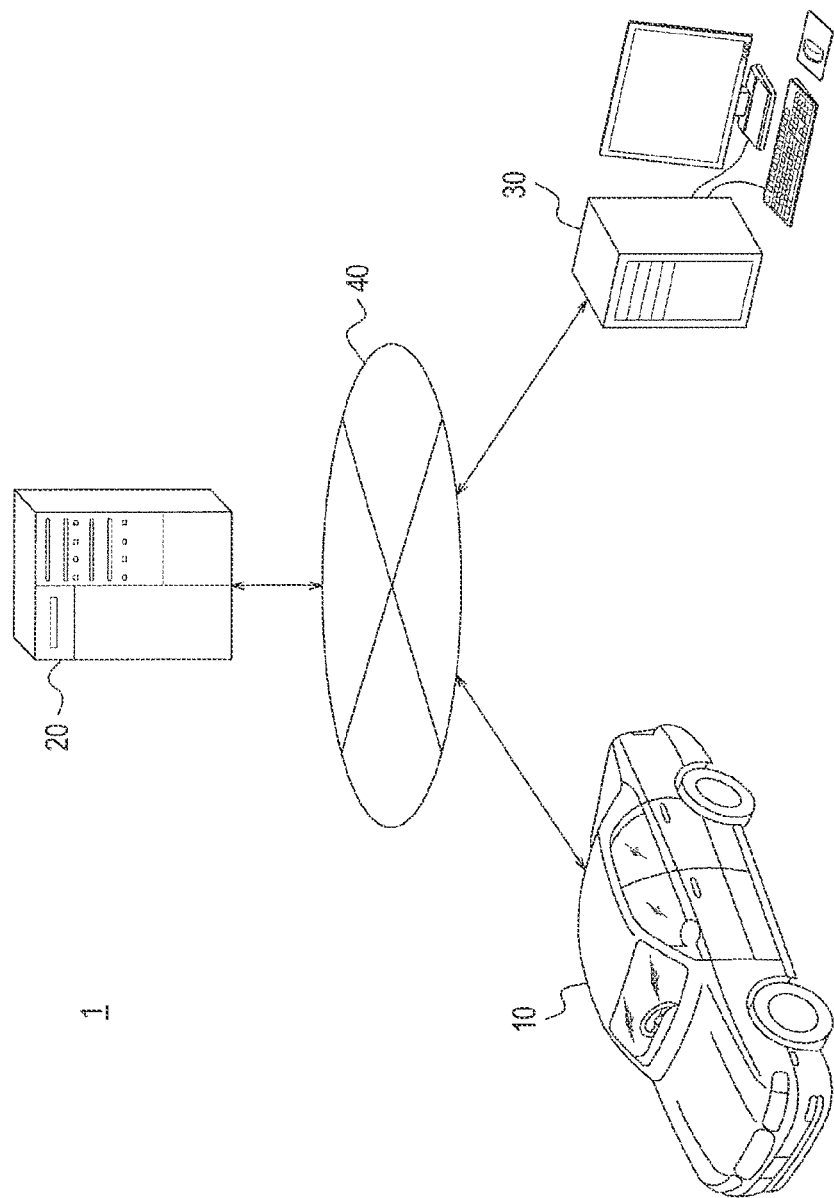
FIG. 1 is a diagram schematically illustrating a configuration of an information processing system according to an embodiment of the disclosure.

FIG. 1 is a diagram schematically illustrating a configuration of an information processing system 1 according to an embodiment of the disclosure. A configuration and a function of the information processing system 1 according to the embodiment of the disclosure will be mainly described below with reference to FIG. 1.

The information processing system 1 includes a vehicle 10, a server 20, and an information processing terminal 30 of an insurance company. The vehicle 10, the server 20, and the information processing terminal 30 are connected to, for example, a network 40 including a mobile communication network and the Internet in a communicative manner. For example, the vehicle 10 and the server 20 may be communicatively connected to each other via the network 40. For example, the server 20 and the information processing terminal 30 are communicatively connected to each other via the network 40.

The vehicle 10 is, for example, an automobile, but is not limited thereto and may be an arbitrary vehicle which a person can board. The vehicle 10 is a vehicle which is driven by a driver, but is not limited thereto and may be, for example, a vehicle which is subjected to automated driving. Automated driving includes, for example, levels 1 to 4 which are defined by the Society of Automotive Engineers (SAE), but is not limited thereto and may be arbitrarily defined. In FIG. 1, for the purpose of convenience of explanation, only one vehicle 10 is illustrated, but the number of vehicles 10 in the information processing system 1 is actually two or more.

The server 20 is, for example, a general-purpose information processing device having a function of a server device. The server 20 is not limited thereto and may be another information processing device dedicated for the information processing system 1. In FIG. 1, for the purpose of convenience of explanation, only one server 20 is illustrated, but the number of servers 20 in the information processing system 1 is actually two or more.

The information processing terminal 30 is, for example, a personal computer (PC) which is owned by an insurance company. An insurance company is an arbitrary insurance company with which a driver of the vehicle 10 as an insured person makes an insurance contract for an automobile insurance or the like. The information processing terminal 30 is not limited thereto and may be a smartphone of an employee of the insurance company or may be a server device which is used by the insurance company.

In the outline of this embodiment, the server 20 acquires position information of the vehicle 10 and driving information of the driver of the vehicle 10 which are acquired by the vehicle 10 from the vehicle 10 via the network 40. The server 20 calculates a driving skill level of the driver of the vehicle 10 based on the driving information acquired from the vehicle 10. When a notification of occurrence of a traffic accident associated with the vehicle 10 is received from the vehicle 10, the server 20 generates position information of a point P at which the traffic accident occurs based on the position information of the vehicle 10 with reference to road map information. The road map information may be stored in the server 20 in advance or may be appropriately acquired from an external information processing device. The server 20 generates and stores provision information in which the generated position information is correlated with the calculated driving skill level and the number of times of occurrence of a traffic accident at the point P. The server 20 provides the generated provision information to the insurance company.

As described above, according to this embodiment, the information processing system 1 can provide a driving skill level of a driver and the number of times of occurrence of a traffic accident at a point P to an insurance company in correlation with position information of the point P. Accordingly, the insurance company can appropriately determine details of compensation for an insured person in association with the traffic accident which has occurred at the point P based on the driving skill level of the driver who is an insured person and the number of times of occurrence of a traffic accident at the point P. The details of compensation for the insured person include, for example, a fault ratio of the driver in the traffic accident and an amount of compensation at that time. The insurance company can determine a specific reference for the fault ratio of the insured person at the traffic accident and the amount of compensation which is to be paid to the insured person based on the provision information from the information processing system 1. The insurance company can efficiently conduct business when a traffic accident occurs based on the provision information from the information processing system 1.

The configuration of the information processing system 1 will be described below in detail.

Vehicle

Figure 2:
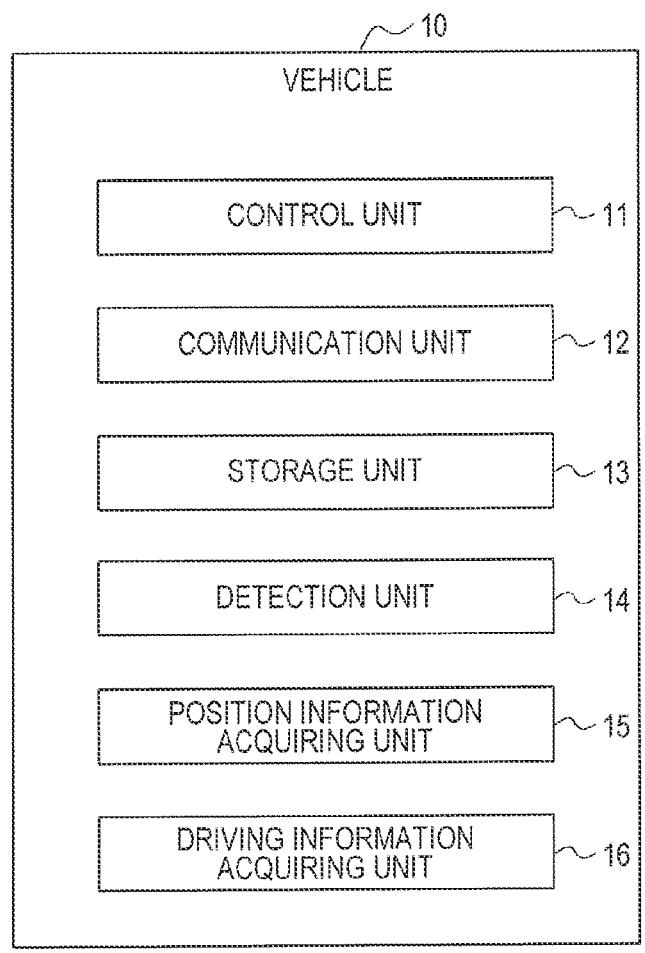
FIG. 2 is a block diagram schematically illustrating a configuration of a vehicle.

FIG. 2 is a block diagram schematically illustrating a configuration of the vehicle 10. As illustrated in FIG. 2, the vehicle 10 includes a control unit 11, a communication unit 12, a storage unit 13, a detection unit 14, a position information acquiring unit 15, and a driving information acquiring unit 16. These constituent units of the vehicle 10 are communicatively connected to each other, for example, via an onboard network such as a controller area network (CAN) or a dedicated line.

The control unit 11 includes one or more processors. In this embodiment, a "processor" is a general-purpose processor or a dedicated processor specialized in a specific process, but is not limited thereto. An electronic control unit (ECU) which is mounted in the vehicle 10 may serve as the control unit 11. For example, the control unit 11 is communicatively connected to the constituent units of the vehicle 10 and controls the whole operation of the vehicle 10. In this embodiment, for example, the control unit 11 acquires a variety of information by controlling acquisition units. For example, the control unit 11 controls the communication unit 12 such that the acquired information is transmitted to the server 20 via the network 40.

The communication unit 12 includes a communication module that performs communication via the onboard network or the dedicated line. The communication unit 12 includes a communication module that is connected to the network 40. For example, the communication unit 12 may include a communication module corresponding to a mobile communication standard such as 4th generation (4G) and 5th generation (5G). An onboard communication device such as a data communication module (DCM) may serve as the communication unit 12. In this embodiment, the vehicle 10 is connected to the network 40 via the communication unit 12.

The storage unit 13 includes one or more memories. In this embodiment, each "memory" may be, for example, a semiconductor memory, a magnetic memory, or an optical memory, but is not limited thereto. Each memory included in the storage unit 13 may serve as, for example, a main storage device, an auxiliary storage device, or a cache storage device. The storage unit 13 stores arbitrary information which is used for operation of the vehicle 10. For example, the storage unit 13 may store a system program, an application program, road traffic information, road map information, and a variety of information which is acquired by the acquisition units of the vehicle 10. Information stored in the storage unit 13 may be updated, for example, based on information which is acquired from the network 40 via the communication unit 12.

The detection unit 14 detects occurrence of a traffic accident associated with the vehicle 10. In this embodiment, the detection unit 14 includes an outside camera that images outside of the vehicle 10. The detection unit 14 detects occurrence of a traffic accident, for example, from a traveling image of the vehicle 10 which is captured by the outside camera. The detection unit 14 may detect occurrence of a traffic accident from a traveling image of the vehicle 10 which is captured by the outside camera using an arbitrary image recognition technique.

The configuration of the detection unit 14 is not limited to the above description. The detection unit 14 may include an arbitrary sensor that can detect occurrence of a traffic accident such as a Light Detecting and Ranging (LIDAR) device, a radar, a sound locator, a speed sensor, an acceleration sensor, a steering angle sensor, a pressure sensor, or a displacement sensor.

The position information acquiring unit 15 acquires position information of the vehicle 10. In this embodiment, the position information acquiring unit 15 includes one or more receivers corresponding to an arbitrary satellite positioning system. For example, the position information acquiring unit 15 includes a Global Positioning System (GPS) receiver. Here, the position information acquiring unit 15 acquires the position information of the vehicle 10 based on the GPS. The position information includes, for example, latitude, longitude, altitude, and a travel lane position. The position information acquiring unit 15 may continually acquire the position information of the vehicle 10 or may periodically acquire the position information.

The configuration of the position information acquiring unit 15 is not limited to the above description. The position information acquiring unit 15 may include a geomagnetic sensor and an angular acceleration sensor. Here, the position information acquiring unit 15 may acquire a direction of the vehicle 10.

The driving information acquiring unit 16 acquires driving information of a driver of the vehicle 10. In this embodiment, the driving information acquiring unit 16 includes an inside camera that is installed in the inside of the vehicle 10. The driving information acquiring unit 16 acquires the driving information of a driver, for example, from an image which is captured by the inside camera. The driving information includes, for example, at least one of an expression, a face direction, a sight line, a blinking state, an action, driving duration, speed control, traveling lane keeping, front confirmation, rear confirmation, side confirmation, and attributes including age, sex, nationality, and race. The driving information acquiring unit 16 may continually acquire the driving information of a driver of the vehicle 10 or may periodically acquire the driving information.

The driving information acquiring unit 16 may acquire the driving information from an image which is captured by the inside camera, for example, using a face recognition technique. In addition, the driving information acquiring unit 16 may acquire the driving information from an image which is captured by the inside camera using an arbitrary image recognition technique.

The configuration of the driving information acquiring unit 16 is not limited to the above description. The driving information acquiring unit 16 is not limited to an inside camera and may include another arbitrary image sensor. The driving information acquiring unit 16 may include another arbitrary sensor that is connected to the CAN. The sensors include an arbitrary sensor that can acquire the driving information such as a speed sensor, an acceleration sensor, and a steering angle sensor. The driving information acquiring unit 16 may acquire the driving information of a driver of the vehicle 10, for example, from output information which is output from the sensors. Here, the driving information may include information on at least one of an accelerator operation, a brake operation, a clutch operation, a blinker operation, a gear operation, a wiper operation, a door mirror operation, a seat operation, an audio operation, a light operation, a steering operation, an air-conditioning operation, and a seat belt operation.

The configuration of the driving information acquiring unit 16 is not limited to the above description. The driving information acquiring unit 16 may include an arbitrary sound sensor that is installed in the inside of the vehicle 10 and is connected to the CAN. The driving information acquiring unit 16 may acquire the driving information, for example, from output information which is output from the sound sensor. Here, the driving information may include, for example, sound information based on a driver including conversation of the driver, speech which is generated by an action of the driver and which is expressing speech in another spoken language, or sound which is generated by an action of the driver and which is generated as other sounds.

The configuration of the driving information acquiring unit 16 is not limited to the above description. The driving information acquiring unit 16 may include an arbitrary biometric sensor that is installed in the inside of the vehicle 10 and is connected to the CAN. The driving information acquiring unit 16 may acquire the driving information, for example, from output information which is output from the biometric sensor. Here, the driving information may include, for example, biological conditions of a driver including brainwaves, a cerebral blood flow, a blood pressure, a blood sugar level, blood amino acids, a heartbeat, a pulse, a body temperature, a sensory temperature, a sense of hunger, and fatigue.

Server

Figure 3:
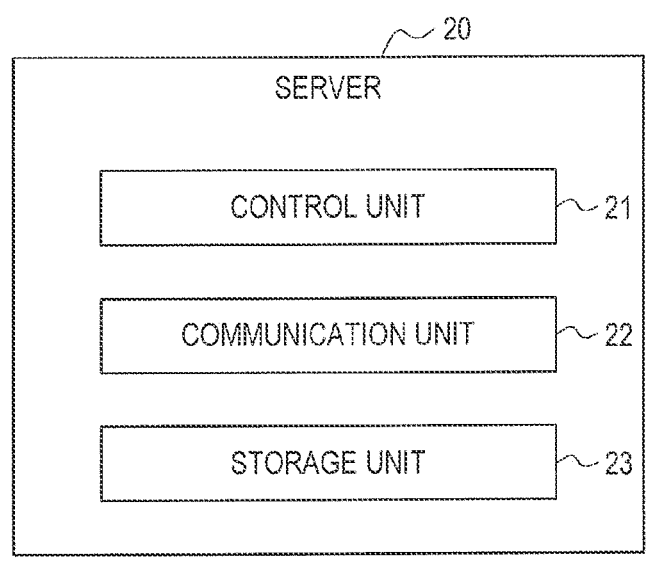
FIG. 3 is a block diagram schematically illustrating a configuration of a server.

FIG. 3 is a block diagram schematically illustrating the configuration of the server 20. As illustrated in FIG. 3, the server 20 includes a control unit 21, a communication unit 22, and a storage unit 23.

The control unit 21 includes one or more processors. The control unit 21 is communicatively connected to the constituent units of the server 20 and controls the overall operation of the server 20. For example, the control unit 21 acquires a variety of information from the vehicle 10 via the network 40 by controlling the communication unit 22. For example, the control unit 21 controls the storage unit 23 such that information required for the operation of the information processing system 1 is stored in the storage unit 23.

The communication unit 22 includes a communication module that is connected to the network 40. For example, the communication unit 22 may include a communication module corresponding to a wired local area network (LAN) standard. In this embodiment, the server 20 is connected to the network 40 via the communication unit 22.

The storage unit 23 includes one or more memories. Each memory included in the storage unit 23 may serve as, for example, a main storage device, an auxiliary storage device, or a cache storage device. The storage unit 23 stores arbitrary information which is used for the operation of the server 20. For example, the storage unit 23 may store a system program, an application program, road traffic information, road map information, and a variety of information which is acquired by the acquisition units of the vehicle 10. The storage unit 23 stores other information which is required for the operation of the information processing system 1. For example, the storage unit 23 stores provision information in which position information of a point P at which a traffic accident occurs is correlated with a driving skill level of a driver which will be described later and the number of times of occurrence of a traffic accident at the point P. For example, the provision information may be managed as big data by collecting data on various traffic accidents in the past associated with a plurality of vehicles 10 in the server 20. Information stored in the storage unit 23 may be updated, for example, based on information which is acquired from the network 40 via the communication unit 22.

The control unit 21 calculates a driving skill level of a driver of the vehicle 10, for example, using machine learning based on the driving information which is acquired by the driving information acquiring unit 16 of the vehicle 10. The control unit 21 may have an arbitrary learning processing configuration for performing such a calculation process. The driving skill level may be calculated based on an arbitrary index. For example, the driving skill level may be expressed by one of three levels including "low" "middle," and "high." The driving skill level is not limited thereto and may be expressed, for example, by numerical values of 0 to 100. In this way, the driving skill level may be expressed by numerical values in an arbitrary numerical range. Here, as the value of the driving skill level increases, it refers to a higher driving skill level of a driver of the vehicle 10. On the other hand, as the value of the driving skill level decreases, it refers to a lower driving skill level of a driver of the vehicle 10.

When a notification of occurrence of a traffic accident is received from the vehicle 10, the control unit 21 generates provision information in which position information of a point P at which the traffic accident occurs is correlated with a driving skill level of a driver of the vehicle 10 and the number of times of occurrence of a traffic accident at the point P and stores the generated provision information in the storage unit 23. For example, the number of times of occurrence of a traffic accident at the point P may be calculated based on data on various traffic accidents in the past associated with a plurality of vehicles 10 which is managed as big data by the server 20 or may be calculated based on data on the same traffic accident which is suitably acquired from another information processing device which is not included in the information processing system 1.

The control unit 21 provides the generated provision information to an insurance company. For example, the control unit 21 transmits the provision information to an information processing terminal 30 of the insurance company via the communication unit 22. A method of providing the provision information from the control unit 21 is not limited thereto. For example, the control unit 21 may allow an employee of the insurance company to read the provision information stored in the storage unit 23 through access to the server 20 via the network 40.

The control unit 21 may generate provision information by correlating the position information of the point P with a traveling image of the vehicle 10 which is captured by the outside camera of the detection unit 14 in addition to the driving skill level of the driver of the vehicle 10 and the number of times of occurrence of a traffic accident at the point P. That is, the provision information may include a traveling image of the vehicle 10 which is captured by the outside camera.

FIG. 4 is a diagram illustrating an example of provision information which is stored in the storage unit 23 of the server 20. The provision information which is provided to an insurance company by the information processing system 1 will be more specifically described below with reference to FIG. 4. In FIG. 4, for the purpose of convenience of explanation, only representative points P1 and P2 are exemplified as points P at which traffic accidents associated with a plurality of vehicles 10 have occurred. However, the disclosure is not limited thereto and the points P at which traffic accidents have occurred may include a plurality of other points in addition to points P1 and P2 or may include only one of points P1 and P2.

For example, in association with the point P1 at which a traffic accident has occurred, the provision information stored in the storage unit 23 includes the number of times of occurrence of a traffic accident depending on the driving skill levels of drivers of the vehicles 10. More specifically, when the driving skill level is "low;" the number of times of occurrence of a traffic accident at the point P1 is 10. When the driving skill level is "middle," the number of times of occurrence of a traffic accident at the point P1 is 5. When the driving skill level is "high," the number of times of occurrence of a traffic accident at the point P1 is 1. In this way, the number of times of occurrence of a traffic accident at the point P1 increases, for example, as the driving skill level of the driver of the vehicle 10 decreases.

Since the number of times of occurrence of a traffic accident changes depending on a driving skill level of a driver in the provision information associated with the point P1, for example, an insurance company may change an amount of compensation which is applied in an insurance contract which has been made by the driver of the vehicle 10 depending on the driving skill level thereof. For example, an insurance company may determine that the number of times of occurrence of a traffic accident at the point P1 decreases as the driving skill level increases and thus there is no problem in view of payment even when a large amount of compensation is paid, and increase the amount of compensation as the driving skill level increases. On the other hand, the insurance company may determine that the number of times of occurrence of a traffic accident at the point P1 decreases as the driving skill level increases and thus a traffic accident which is caused by a driver with a high driving skill level is largely based on a fault of the driver, and may decrease the amount of compensation by increasing a fault ratio of the driver as the driving skill level increases.

For example, in association with the point P2 at which a traffic accident has occurred, the provision information stored in the storage unit 23 includes the number of times of occurrence of a traffic accident in correlation with the driving skill levels of drivers of the vehicles 10. More specifically, when the driving skill level is "low," the number of times of occurrence of a traffic accident at the point P2 is 5. When the driving skill level is "middle," the number of times of occurrence of a traffic accident at the point P2 is 5. When the driving skill level is "high," the number of times of occurrence of a traffic accident at the point P2 is 5. In this way, for example, the number of times of occurrence of a traffic accident at the point P2 is constant regardless of the driving skill levels of the drivers of the vehicles 10.

Since the number of times of occurrence of a traffic accident is constant regardless of the driving skill levels of the drivers in the provision information associated with the point P2, for example, an insurance company may keep an amount of compensation, which is applied in an insurance contract which has been made by the driver of the vehicle 10, constant regardless of the driving skill level thereof. For example, an insurance company may determine that the traffic accidents at the point P2 do not depend on the driving skill level but depends on, for example, only traveling conditions at the point P2, and keep the amount of compensation constant regardless of the driving skill level.

As described above, an insurance company can determine a relationship between a driving skill level and the number of times of occurrence of a traffic accident for each point P based on the provision information illustrated in FIG. 4 and determine the details of compensation for each point P.

Flow of Operations in Information Processing System

FIG. 5 is a sequence diagram illustrating an example of a flow of operations in the information processing system 1. An example of the flow of operations in the information processing system 1 will be described below with reference to FIG. 5.

Step S100: The control unit 11 of the vehicle 10 acquires position information of the vehicle 10 using the position information acquiring unit 15. The control unit 11 of the vehicle 10 acquires driving information of a driver of the vehicle 10 using the driving information acquiring unit 16.

Step S101: The control unit 11 of the vehicle 10 transmits the position information of the vehicle 10 and the driving information of the driver which are acquired in Step S100 to the server 20 via the communication unit 12. For example, the control unit 21 of the server 20 may continually acquire the position information of the vehicle 10 and the driving information of the driver thereof from the communication unit 12 or may appropriately acquire the information at a predetermined time.

Step S102: The control unit 21 of the server 20 calculates a driving skill level of the driver based on the driving information of the driver which is received in Step S101.

Step S103: The control unit 11 of the vehicle 10 detects occurrence of a traffic accident associated with the vehicle 10 using the detection unit 14.

Step S104: The control unit 11 of the vehicle 10 transmits a notification of occurrence of a traffic accident which is detected in Step S103 to the server 20 via the communication unit 12.

Step S105: When the notification of occurrence of the traffic accident is received from the vehicle 10 in Step S104, the control unit 21 of the server 20 generates and stores provision information in which position information of a point P at which the traffic accident has occurred is correlated with the driving skill level of the driver and the number of times of occurrence of a traffic accident at the point P.

Step S106: The control unit 21 of the server 20 provides the provision information which is generated in Step S105 to an insurance company.

As described above, with the information processing system 1 according to this embodiment, it is possible to contribute to appropriate determination of details of compensation which is provided to an insured person from the insurance company when a traffic accident occurs. The information processing system 1 can provide provision information in which position information of a point P is correlated with a driving skill level of a driver and the number of times of occurrence of a traffic accident to an insurance company. Accordingly, the insurance company can appropriately determine details of compensation for an insured person based on the provision information in association with the traffic accident which has occurred at the point P. The insurance company can determine, for example, a fault ratio of the insured person in association with a traffic accident and a specific reference for an amount of compensation which is paid to the insured person based on the provision information which is provided by the information processing system 1. The insurance company can efficiently conduct business when a traffic accident occurs based on the provision information from the information processing system 1.

Since the information processing system 1 transmits the provision information to an information processing terminal 30 of an insurance company, it is possible to improve convenience for an employee of the insurance company. An employee of the insurance company can easily acquire information which is required for determining details of compensation in insurance without accessing the server 20.

Since the information processing system 1 detects occurrence of a traffic accident from a traveling image of a vehicle 10 which is captured by the outside camera, it is possible to accurately detect whether a traffic accident has occurred based on visual information. Since the information processing system 1 provides the traveling image of the vehicle 10 captured by the outside camera along with the provision information to the insurance company, the insurance company can more appropriately determine details of compensation.

The information processing system 1 can accurately acquire driving information of a driver based on visual information by acquiring the driving information from an image which is captured by the inside camera. The information processing system 1 can acquire a variety of driving information, which cannot be acquired based on visual information, by acquiring driving information of a driver from output information which is output from an arbitrary sensor which can acquire driving information. For example, the information processing system 1 can acquire information on a delicate operation, which cannot be acquired from visual information, from output information which is output from a sensor. For example, the information processing system 1 can acquire sound information based on a driver, which cannot be acquired from visual information, from output information which is output from a sound sensor. For example, the information processing system 1 can acquire biological conditions of a driver, which cannot be acquired from visual information, from output information which is output from a biometric sensor.

While the disclosure has been described above in conjunction with all the drawings and embodiments, it should be noted by those skilled in the art that various modifications and corrections can be easily made based on the present disclosure. Accordingly, it should be noted that such modifications and corrections are included in the scope of the disclosure. For example, the functions included in the units or the operations can be rearranged as long as doing so does not result in logical inconsistency, and a plurality of units or operations may be combined into one unit or an operation or may be divided.

For example, in the above-mentioned embodiment, the constituent units of the vehicle 10 are mounted in the vehicle 10. However, some or all processing operations which are performed by the constituent units of the vehicle 10 may be performed by an arbitrary electronic device such as a smartphone or a computer.

For example, a general-purpose electronic device such as a smartphone or a computer may be made to serve as the constituent units of the vehicle 10 or the server 20 according to the above-mentioned embodiment. For example, a program in which processing details for realizing the functions of the communication unit 12 and the like according to the embodiment are described may be stored in a memory of an electronic device and a processor of the electronic device be made to read and execute the program. Accordingly, the disclosure can also be embodied as a program which can be executed by a processor.

In the above-mentioned embodiment, the information processing system 1 calculates a driving skill level of a driver based on driving information. However, information which is calculated based on the driving information is not limited to the driving skill level of a driver. Information which is calculated based on the driving information may be an arbitrary index in which a driving skill and a driving style of a driver are reflected.

What is claimed is:

1. A server configured to communicate with a vehicle, the server comprising one or more processors configured to:
   receive a notification of occurrence of a traffic accident from the vehicle, the vehicle including an outside camera that images an outside of the vehicle and at least one of an inside camera installed in an inside of the vehicle or an in-vehicle sensor connected to the vehicle via an in-vehicle network;
   acquire position information on a point at which the traffic accident has occurred;
   calculate a driving skill level of a driver of the vehicle based on driving information on the driver of the vehicle, wherein the driving information is based on at least one of an image captured by the inside camera or information output from the inside camera or the in-vehicle sensor;
   generate provision information in which the position information is correlated with the driving skill level and the number of times of occurrence of traffic accident at the point, the provision information including a traveling image of the vehicle that is captured by the outside camera; and
   transmit the provision information to an information processing terminal of an insurance company, when the notification of occurrence of the traffic accident is received from the vehicle.

2. The server according to claim 1, further comprising one or more memories configured to store the provision information, wherein the one or more processors are configured to acquire the number of times of the occurrence of the traffic accident at the point based on the provision information generated in a past and stored in the one or more memories.

3. The server according to claim 1, wherein the one or more processors are further configured to acquire the number of times of the occurrence of the traffic accident at the point based on information acquired from an information processing device circuitry that is external to the vehicle and the server.

4. The server according to claim 1, wherein the number of times of the occurrence of the traffic accident at the point is the number of traffic accidents occurred by other drivers who have the same driving skill level as the driver.

5. An information processing method executed by a server configured to communicate with a vehicle, the information processing method comprising:
   receiving a notification of occurrence of a traffic accident from the vehicle, the vehicle including an outside camera that images an outside of the vehicle and at least one of an inside camera installed in an inside of the vehicle or an in-vehicle sensor connected to the vehicle via an in-vehicle network;
   acquiring position information on a point at which the traffic accident has occurred;
   calculating a driving skill level of a driver of the vehicle based on driving information on the driver of the vehicle, wherein the driving information is based on at least one of an image captured by the inside camera or information output from the inside camera or the in-vehicle sensor;
   generating provision information in which the position information is correlated with the driving skill level and the number of times of occurrence of traffic accident at the point, the provision information including a traveling image of the vehicle that is captured by the outside camera; and
   transmitting the provision information to an information processing terminal of an insurance company, when the notification of occurrence of the traffic accident is received from the vehicle.

6. A non-transitory storage medium storing instructions that are executable by one or more processors in a server and cause the one or more processors to perform functions, the server being configured to communicate with a vehicle, the functions comprising:
   receiving a notification of occurrence of a traffic accident from the vehicle, the vehicle including an outside camera that images an outside of the vehicle and at least one of an inside camera installed in an inside of the vehicle or an in-vehicle sensor connected to the vehicle via an in-vehicle network;
   acquiring position information on a point at which the traffic accident has occurred;
   calculating a driving skill level of a driver of the vehicle based on driving information on the driver of the vehicle, wherein the driving information is based on at least one of an image captured by the inside camera or information output from the inside camera or the in-vehicle sensor;
   generating provision information in which the position information is correlated with the driving skill level and the number of times of occurrence of traffic accident at the point, the provision information including a traveling image of the vehicle that is captured by the outside camera; and
   transmitting the provision information to an information processing terminal of an insurance company, when the notification of occurrence of the traffic accident is received from the vehicle.

* * * * *